United States Patent
Wang

(10) Patent No.: US 8,203,852 B2
(45) Date of Patent: Jun. 19, 2012

(54) EXPANSION CARD RETENTION ASSEMBLY

(75) Inventor: Wei-Jun Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 226 days.

(21) Appl. No.: 12/765,053

(22) Filed: Apr. 22, 2010

(65) Prior Publication Data

US 2011/0149535 A1    Jun. 23, 2011

(30) Foreign Application Priority Data

Dec. 22, 2009  (CN) .......................... 2009 1 0312001

(51) Int. Cl.
H05K 7/12 (2006.01)

(52) U.S. Cl. ........ 361/801; 361/759; 361/747; 361/740; 361/732

(58) Field of Classification Search .................. 361/726, 361/732, 740, 747, 759, 801; 312/223.2, 312/223.3
See application file for complete search history.

(56) References Cited

U.S. PATENT DOCUMENTS

| | | | | |
|---|---|---|---|---|
| 6,515,867 | B2* | 2/2003 | Sheng-Hsiung et al. | 361/759 |
| 6,885,565 | B2* | 4/2005 | Shi | 361/801 |
| 6,970,363 | B2* | 11/2005 | Bassett et al. | 361/801 |
| 7,002,811 | B2* | 2/2006 | Jing et al. | 361/801 |
| 7,120,032 | B2* | 10/2006 | Lin et al. | 361/801 |
| 7,283,376 | B2* | 10/2007 | Han et al. | 361/801 |
| 7,486,527 | B1* | 2/2009 | Yang | 361/801 |
| 7,561,440 | B2* | 7/2009 | Dai | 361/801 |
| 7,596,001 | B2* | 9/2009 | Tang | 361/801 |
| 7,855,898 | B2* | 12/2010 | Tang | 361/801 |
| 7,907,421 | B2* | 3/2011 | Chen et al. | 361/801 |

* cited by examiner

Primary Examiner — Dameon Levi
(74) Attorney, Agent, or Firm — Altis Law Group, Inc.

(57) ABSTRACT

A retention assembly for an expansion card in an enclosure, the expansion card having an expansion card cover plate. The retention assembly includes an expansion card mounting frame, a limiting member, a resisting member, and an elastic member. The expansion card mounting frame is disposed on the enclosure to fix the expansion card cover plate. The limiting member is disposed on the enclosure adjacent to the expansion card mounting frame, and the limiting member and the enclosure cooperatively define a guide groove. The resisting member includes a resisting portion and a limiting portion connected to the resisting portion and slidably received in the guide groove. The elastic member interconnects the expansion card mounting frame and the resisting member. The resisting portion resists the expansion card cover plate by a resilient force applied by the elastic member.

8 Claims, 4 Drawing Sheets

EXPANSION CARD RETENTION ASSEMBLY

BACKGROUND

1. Technical Field

The present disclosure relates generally to retention assemblies for a plurality of expansion cards used in an electronic device enclosure.

2. Description of Related Art

Computers, including servers, often include expansion capabilities to allow addition of various expansion cards, such as peripheral component interconnect (PCI) cards, into the system. Referring to FIG. 4, a frequently used retention assembly for securing an expansion card to an electronic device enclosure 13 is shown. The retention assembly includes a retaining plate 11, a plurality of screws 12, and a plurality of slot covers 14. An expansion slot (not labeled) is defined in the electronic device enclosure 13. A mounting bracket 132 is formed surrounding a periphery of the expansion slot. The slot covers 14 cover the expansion slot and secure/protect the expansion cards. Each of the slot covers 14 is a piece of long strip having a bent portion (not labeled) adjoining the mounting bracket 132. When an expansion card is fixed to the electronic device enclosure 13, the retaining plate 11 is positioned on the bent portions of the slot covers 14, and is fixed onto the electronic device enclosure 13 via the screws 12, thereby fastening the slot covers 14 to the electronic device enclosure 13.

In the assembly described, the slot covers 14 are secured to the electronic device enclosure 13 by the screws 12. However, installing or removing the screws 12 is unduly time-consuming and laborious. This leads to lower efficiency of installation and removal of expansion cards. In addition, a tool for installing or removing screws is needed for installation or removal. These problems are multiplied in mass production facilities. Furthermore, after extended use, the screws 12 and screw holes may no longer reliably engage.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
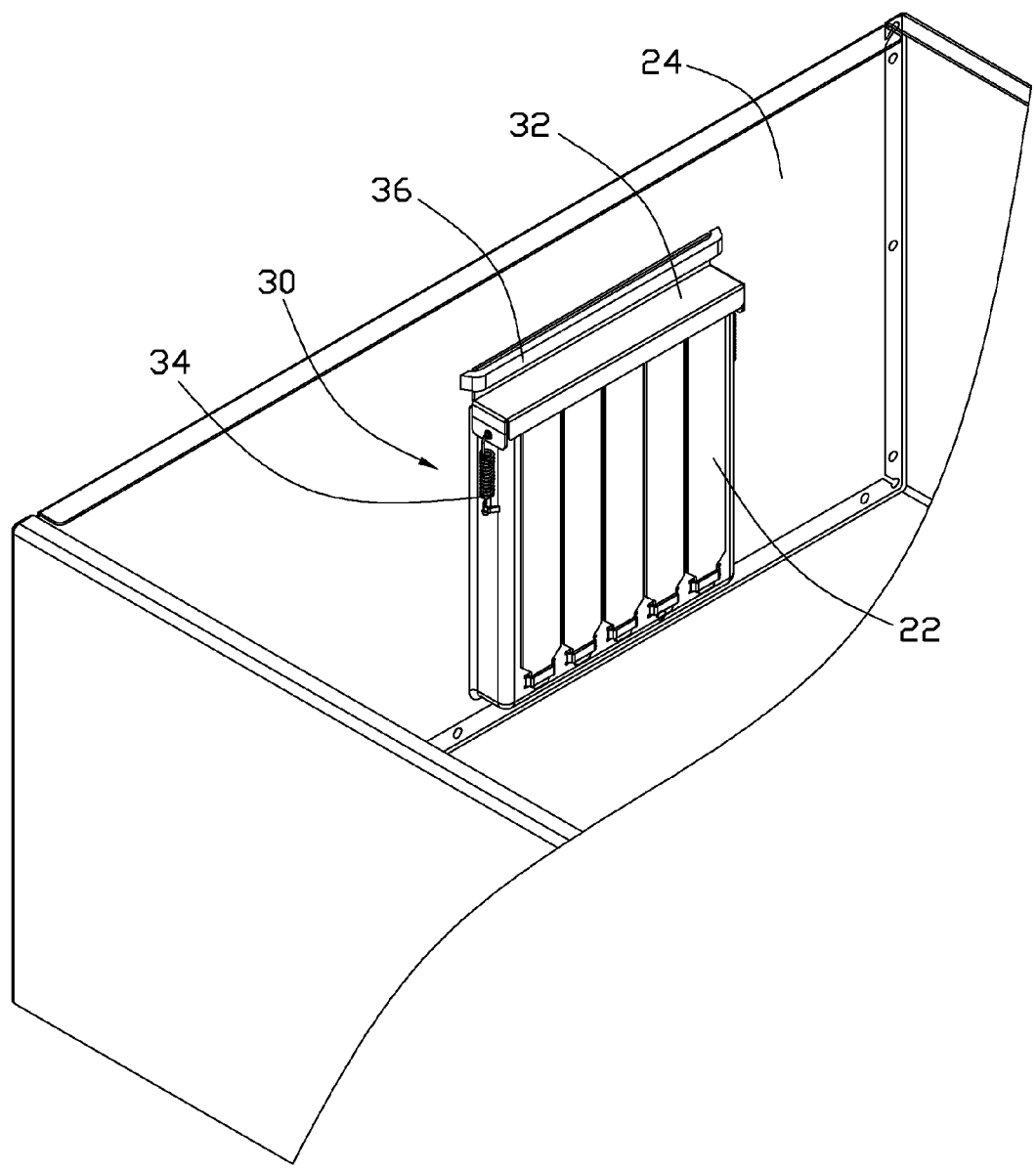
FIG. 1 is an assembled, isometric view of an embodiment of a retention assembly, showing the retention assembly assembled to an enclosure.

Referring to the drawings in detail, FIG. 1 shows an embodiment of a retention assembly 30 according to the present invention assembled in one wall of an enclosure 24 such as an electronic device enclosure. The retention assembly 30 is configured to mount an expansion card cover plate 22 for expansion cards (not shown) to the enclosure 24.

Figure 2:
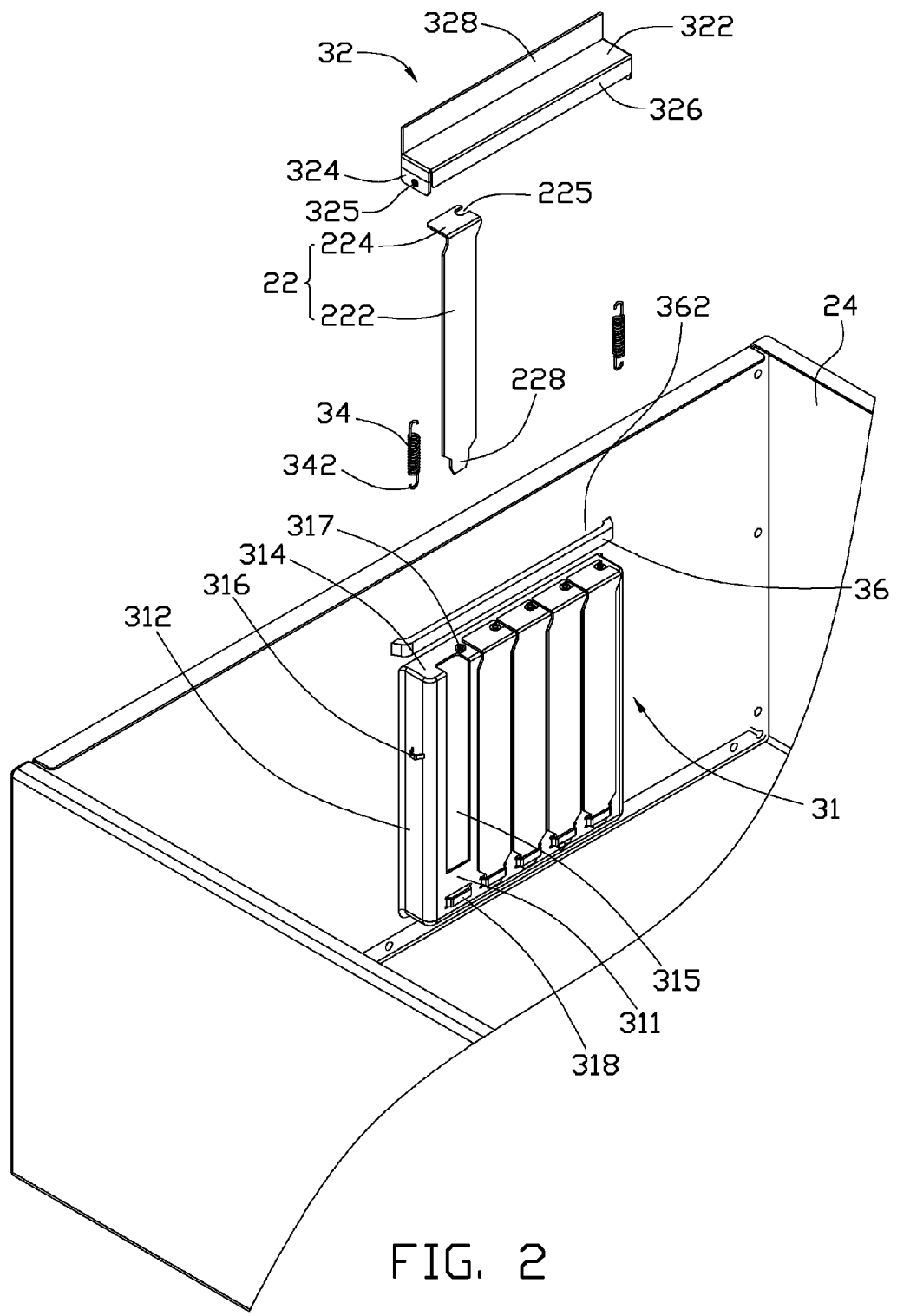
FIG. 2 is a partially exploded, isometric view of the retention assembly and the enclosure of FIG. 1.

Referring to FIG. 2, the expansion card cover plate 22 includes a main body 222, which is shaped in a long strip, and a fastening portion 224 extending perpendicular from an end of the main body 222. The fastening portion 224 defines a notch 225 at an edge of the fastening portion 224. The expansion card cover plate 22 further includes a tab 228 extending from another end of the main body 222 opposite to the fastening portion 224. A width of the tab 228 is less than the width of the main body 222.

The retention assembly 30 includes an expansion card mounting frame 31 disposed on a sidewall of the enclosure 24 in the form of a depression towards the interior of the enclosure 24, a resisting member 32, two elastic members 34, and a limiting member 36.

The expansion card mounting frame 31 includes a bottom base 311, which is substantially rectangular, two first sidewalls 312, and a second sidewall 314. The two first side walls 312 extend substantially perpendicular from two opposite sides of the bottom base 311 respectively towards the exterior of the enclosure 24, and connect with the enclosure 24. The second sidewall 314 extends perpendicular from a top side of the bottom base 311 towards the exterior of the enclosure 24, and interconnects the two first side walls 312. The bottom base 311 defines a plurality of expansion slot openings 315 to correspondingly receive the expansion card cover plates 22. Each first sidewall 312 forms a latching hook 316 in a middle portion of the first sidewall 312. The second sidewall 314 forms a plurality of positioning protrusions 317 corresponding to the plurality of notches 225 of the cover plate 22. Each positioning protrusion 317 can be blocked by the notch 225 of the expansion card cover plate 22, such that each expansion card cover plate 22 is limited to move parallel along the second sidewall 314. The bottom base 311 forms a plurality of curved portions 318 adjacent to an end away from the positioning protrusion 317. The curved portion 318 is configured to receive the tab 228 of the expansion card cover plate 22.

The resisting member 32 includes a resisting portion 322, which is shaped substantially as an extended plate, and two first bending portions 324 extending downwards substantially perpendicular from two opposite ends of the resisting portion 322, respectively. A length of the resisting portion 322 exceeds or equals the length of the second sidewall 314. Each first bending portion 324 defines a latching hole 325. The resisting member 32 further includes a second bending portion 326 and a limiting portion 328. The second bending portion 326 extends downwards substantially perpendicular from a side of the resisting portion 322, and interconnects the two first bending portions 324. The second bending portion 326 is configured to resist an upper portion of the main body 222 of the expansion card cover plate 22. The limiting portion 328 extends upwards substantially perpendicular from the other side of the resisting portion 322 away from the second bending portion 326.

The elastic member 34 forms two hooks 342 at opposite ends, respectively; one hook 342 is latched in the latching hole 325, and the other hook 342 is latched by the latching hook 316 of the expansion card mounting frame 31. In the illustrated embodiment, the elastic member 34 is a spring.

The limiting member 36 is an arched elongated bar. Two ends of the limiting member 36 are fixed to a side of the enclosure 24 adjacent to the expansion card mounting frame 31. The limiting member 36 and the enclosure 24 cooperatively form a guide groove 362 slidably receiving the limiting portion 328 of the resisting member 32. A length of the guide groove 362 substantially equals or is larger than the length of the limiting portion 328, such that the limiting portion 328 can only move towards or away from the expansion card mounting frame 31. The greatest distance between the limiting member 36 and the interior surface of the enclosure 24 is less than a width of the resisting portion 322, such that the resisting member 32 stops moving when the resisting portion 322 resists the limiting member 36.

In assembly, the resisting member 32 is positioned on the expansion card mounting frame 31, and the resisting portion 322 resists the second sidewall 314. Two ends of the limiting member 36 are then fixed to a side of the enclosure 24 by welding or using adhesive, and the limiting portion 328 of the resisting member 32 are received in the guide groove 362. Two ends of the elastic member 34 are latched in the latching hole 325 and by the latching hook 316, respectively. After assembly, each elastic member 34 is extended.

Figure 3:
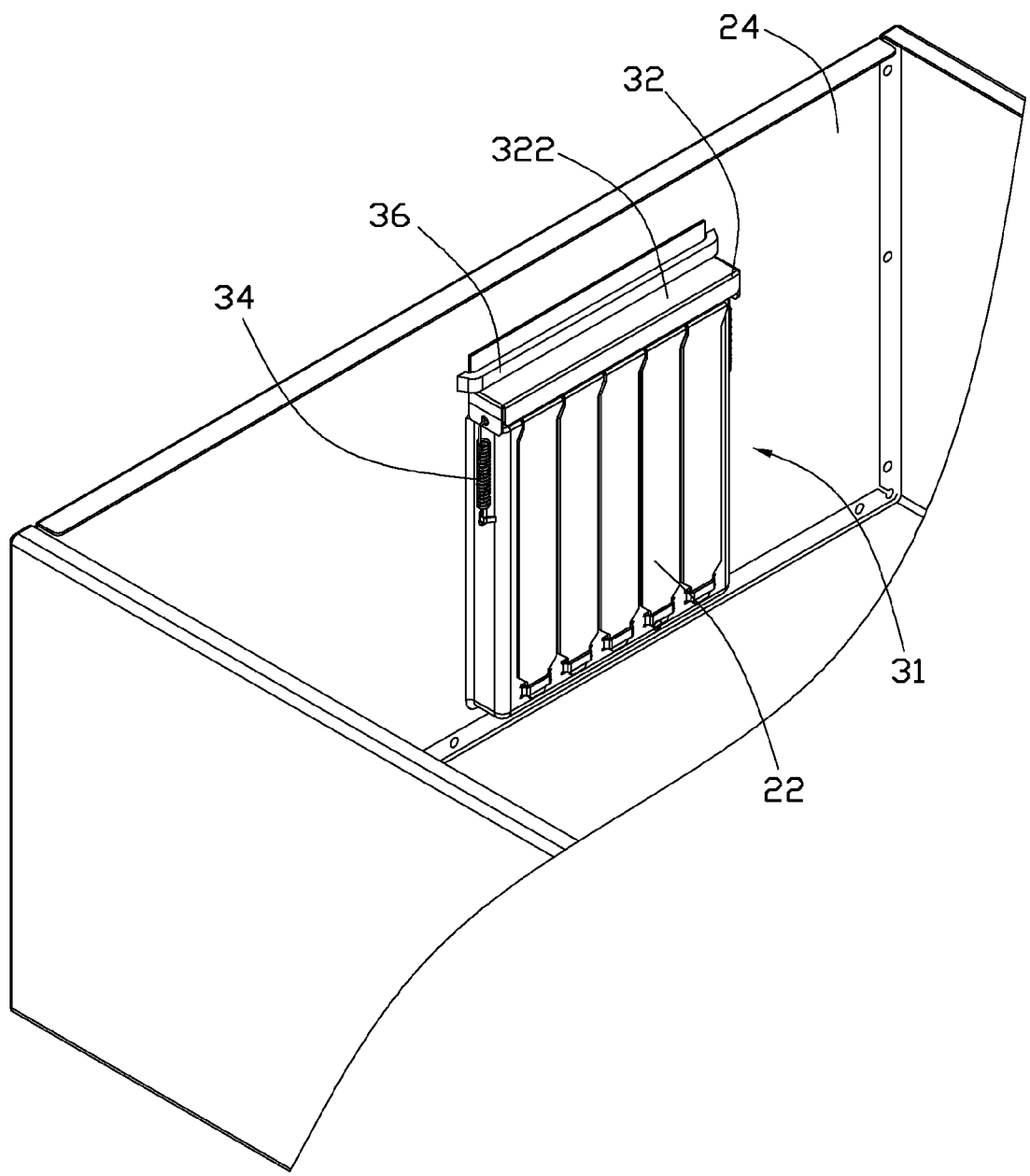
FIG. 3 is similar to FIG. 1, but shows the retention assembly in an open position.
Figure 4:
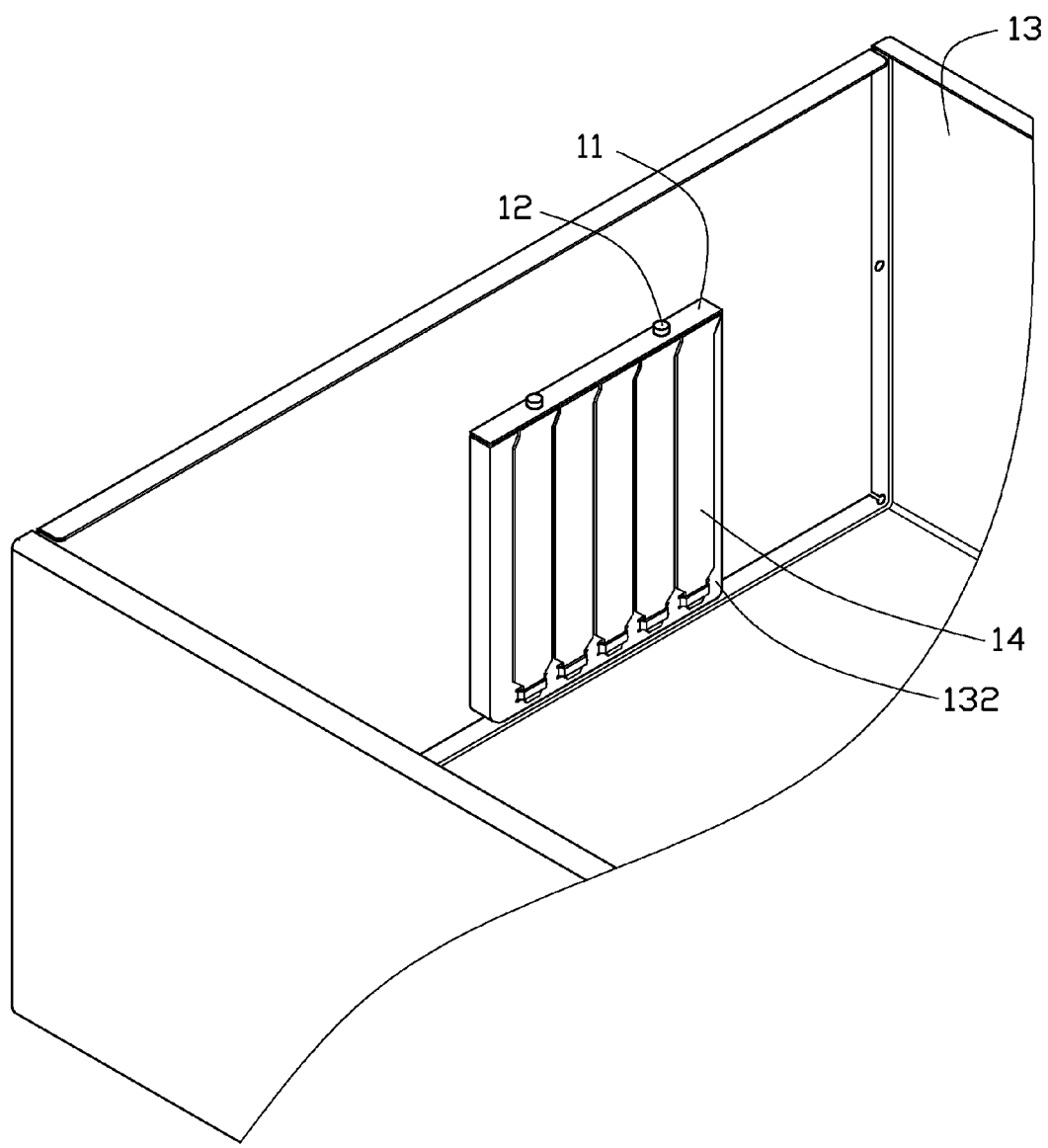
FIG. 4 is an assembled, isometric view of a conventional retention assembly assembled to an enclosure.

Referring also to FIGS. 3 and 4, when the expansion card is to be assembled to the enclosure 24, the resisting member 32 is moved along a sidewall of the enclosure 24 away from the expansion card mounting frame 31. The limiting portion 328 slides in the guide groove 362, and the elastic members 34 are further extended. The resisting member 32 stops when the resisting portion 322 resists the limiting member 36. At the same time, the second bending portion 326 is located above the second sidewall 314. The expansion card cover plate 22 is then positioned corresponding to the expansion slot openings 315 on the expansion card mounting frame 31, with the positioning protrusion 317 received inside the notch 225 and the tab 228 received inside the curved portion 318. The resisting member 32 automatically moves closer to the expansion card mounting frame 31 along a sidewall of the enclosure 24 by resilient force of the elastic members 34 and the limiting effect of the guide groove 362 when external force is removed. The resisting member 32 stops when the resisting portion 322 resists the fastening portion 224. The expansion card cover plate 22 is then firmly fixed to the expansion card mounting frame 31 of the retention assembly 30 by the resilient force of the two elastic members 34.

The expansion card can be easily detached from the enclosure 24 by moving the resisting member 32 along a sidewall of the enclosure 24 away from the expansion card mounting frame until the second bending portion 326 is above the second sidewall 314 so as to allow the expansion card mounting frame 31 and the fastening portion 224 of the expansion card cover plate 22 to be separated from beneath the resisting member 32.

It is to be understood that, in alternative embodiments, the number of elastic members 34 may be one or more than two. The latching hole 325 and the latching hook 316 may be omitted, as long as the two ends of the elastic member 34 are fixed to the expansion card mounting frame 31 and the resisting member 32 by various means such as welding. The first bending portion 324 and the second bending portion 326 may also be omitted. In other alternative embodiments, the limiting portion 328 may be two guiding protrusions extending from two ends of the resisting member 32, and the enclosure 24 may define two guide grooves adjacent to the expansion card mounting frame to slidably receive the two guiding protrusions. The limiting member 36 may also be in the form of two arched elongated bars, each disposed at the opposite sides of the expansion card mounting frame 31.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A retention assembly for an expansion card in an enclosure, the expansion card comprising an expansion card cover plate attached, the retention assembly comprising:
    an expansion card mounting frame disposed on the enclosure to fix the expansion card cover plate;
    a limiting member disposed on the enclosure adjacent to the expansion card mounting frame, the limiting member and the enclosure cooperatively defining a guide groove;
    a resisting member comprising a resisting portion and a limiting portion, the limiting portion connected to the resisting portion and slidably received in the guide groove; and
    an elastic member interconnecting the expansion card mounting frame and the resisting member,
    wherein the resisting portion resists the expansion card cover plate by resilient force applied by the elastic member.

2. The retention assembly of claim 1, wherein the expansion card mounting frame comprises a bottom base and a first sidewall extending from the bottom base, the first sidewall forming a latching hook thereon to latch an end of the elastic member.

3. The retention assembly of claim 2, wherein the expansion card mounting frame comprises a second sidewall extending from the bottom base connected to the first sidewall, the second sidewall forms a positioning protrusion thereon, the expansion card cover plate comprises a main body and a fastening portion extending from an end of the main body, and the fastening portion defines a notch at an edge to receive the positioning protrusion.

4. The retention assembly of claim 1, wherein the resisting member comprises two first bending portions extending from two ends of the resisting portion; wherein at least one first bending portion defines a latching hole receiving an end of the elastic member.

5. The retention assembly of claim 4, wherein the resisting member comprises a second bending portion extending from a side of the resisting portion and interconnecting the two first bending portions; wherein the expansion card cover plate comprises a main body resisted by the second bending portion and a fastening portion extending from an end of the main body resisted by the resisting portion.

6. The retention assembly of claim 5, wherein the limiting portion is extended from a side of the resisting portion away from the second bending portion.

7. The retention assembly of claim 1, wherein the limiting member is an arched elongated bar comprising two ends of the limiting member fixed to the enclosure.

8. The retention assembly of claim 7, wherein a length of the guide groove substantially equals a length of the limiting portion of the resisting member; the greatest distance between the limiting member and the interior surface of the enclosure being less than a width of the resisting portion of the resisting member.

* * * * *